United States Patent
Chun (10) Patent No.: US 10,359,943 B2
(45) Date of Patent: Jul. 23, 2019

(54) DATA STORAGE DEVICE

(71) Applicant: SK hynix Inc., Gyeonggi-do (KR)

(72) Inventor: Dong Yeob Chun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 67 days.

(21) Appl. No.: 15/372,564

(22) Filed: Dec. 8, 2016

(65) Prior Publication Data

US 2018/0059935 A1 Mar. 1, 2018

(30) Foreign Application Priority Data

Aug. 25, 2016 (KR) ........................ 10-2016-0108419

(51) Int. Cl.
*G06F 3/06* (2006.01)

(52) U.S. Cl.
CPC ............ *G06F 3/061* (2013.01); *G06F 3/0655* (2013.01); *G06F 3/0656* (2013.01); *G06F 3/0688* (2013.01)

(58) Field of Classification Search
CPC .............. G06F 3/00; G06F 3/06–0608; G06F 3/061–0613; G06F 3/0614–0655; G06F 3/0656–0688; G06F 3/0689; G06F 11/00–3696; G06F 12/00–16; G06F 13/00–4295; G06F 17/30–30997; G06F 2003/0691–0698; G06F 2201/00–885; G06F 2206/00–20; G06F 2211/00–902; G06F 2212/00–7211; G06F 2213/00–4004; G06F 2216/00–17

See application file for complete search history.

(56) References Cited

U.S. PATENT DOCUMENTS

| 4,435,752 | A  | * | 3/1984 | Winkelman | .......... G06F 3/0601 |
| 6,928,521 | B1 | * | 8/2005 | Burton | ................ G06F 12/0866 |
| | | | | | 711/114 |
| 8,352,690 | B2 | * | 1/2013 | Forhan | .................... G06F 13/14 |
| | | | | | 711/103 |
| 8,966,327 | B1 | * | 2/2015 | Wang | ...................... G06F 12/00 |
| | | | | | 714/27 |
| 9,921,762 | B2 | * | 3/2018 | Amidi | ................. G06F 11/1441 |

(Continued)

FOREIGN PATENT DOCUMENTS

KR 1020110000878 1/2011

OTHER PUBLICATIONS

A flit-level speedup scheme for network-on-chips using self-reconfigurable bi-directional channels; Qian et al.; Proceedings of the Conference on Design, Automation and Test in Europe, pp. 1295-1300; Mar. 12-16, 2012 (Year: 2012).*

(Continued)

*Primary Examiner* — Daniel C. Chappell
(74) *Attorney, Agent, or Firm* — IP & T Group LLP (57) ABSTRACT

A data storage device includes nonvolatile memory devices coupled to a plurality of channels; and a controller including a processor, a buffer and memory controllers which are respectively coupled to the channels, wherein the processor transmits a first access command to a first memory controller in response to a first access request from a host device, regardless of a state of the buffer, and wherein the first memory controller controls an internal operation of a first nonvolatile memory device by determining the state of the buffer, in response to the first access command.

20 Claims, 6 Drawing Sheets

(56) References Cited

U.S. PATENT DOCUMENTS

| | | | | |
|---|---|---|---|---|
| 2003/0126343 A1* | 7/2003 | Olarig | ............... | G06F 12/0607 710/306 |
| 2004/0078518 A1* | 4/2004 | Kuwata | ............... | G06F 12/123 711/113 |
| 2004/0196725 A1* | 10/2004 | Kang | ............... | G11C 7/1066 365/230.08 |
| 2008/0201548 A1* | 8/2008 | Przybylski | ......... | G06F 13/4243 711/171 |
| 2009/0172260 A1* | 7/2009 | Olbrich | ............ | G06F 13/1657 711/103 |
| 2009/0196102 A1* | 8/2009 | Kim | ............... | G11C 7/1045 365/185.11 |
| 2010/0122021 A1* | 5/2010 | Lee | ............... | G06F 3/0613 711/103 |
| 2011/0010511 A1* | 1/2011 | Kinoshita | ......... | G06F 12/0246 711/157 |
| 2011/0072196 A1* | 3/2011 | Forhan | ............ | G06F 13/14 711/103 |
| 2012/0155160 A1* | 6/2012 | Alam | ............... | G11C 7/1042 365/158 |
| 2013/0091237 A1* | 4/2013 | Arulambalam | ......... | H04L 65/60 709/213 |
| 2014/0189212 A1* | 7/2014 | Slaight | ............ | G06F 12/0866 711/103 |
| 2015/0187403 A1* | 7/2015 | Kim | ............... | G11C 8/18 365/189.11 |
| 2016/0004457 A1* | 1/2016 | Fields, Jr. | ............ | G06F 3/0611 711/3 |

OTHER PUBLICATIONS

Domain-wall memory buffer for low-energy NoCs; Kline, Jr. et al.; Proceedings of the 52nd Annual Design Automation Conference, Article No. 11; Jun. 7-11, 2015 (Year: 2015).*

* cited by examiner

DATA STORAGE DEVICE

CROSS-REFERENCES TO RELATED APPLICATION

The present application claims priority under 35 U.S.C. § 119(a) to Korean application number 10-2016-0108419, flied on Aug. 25, 2016, in the Korean Intellectual Property Office, which is incorporated herein by reference in its entirety.

BACKGROUND

1. Technical Field

Various embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

Various embodiments are directed to a data storage device including a controller and a plurality of nonvolatile memory devices, for minimizing overhead of a processor in the controller to improve an operational performance of the data storage device.

In an embodiment, at least one nonvolatile memory device operatively coupled to each of a plurality of channels; and a controller including a processor, a buffer and a plurality of memory controllers, the plurality of memory controllers being respectively coupled to the channels, wherein the processor transmits a first access command to a first memory controller in response to a first access request received from a host device, regardless of a state of the buffer, and wherein the first memory controller controls an internal operation of a first nonvolatile memory device by determining the state of the buffer, in response to the first access command.

In an embodiment, a data storage device may include: nonvolatile memory devices coupled to a plurality of channels; and a controller including a buffer which includes a first region and memory controllers which are respectively coupled to the channels, wherein a first memory controller among the memory controllers controls a read operation of a first nonvolatile memory device by determining a state of the first region, in response to a first read command.

In an embodiment, a solid state drive may include: a processor, a RAM and a storage medium interface, the storage medium interface including at least one memory controller operatively coupled to at least one nonvolatile memory device via a channel, wherein the processor transmits a first access command to the at least one memory controller in response to a first access request received from a host device, regardless of a state of the RAM, and wherein the at least one memory controller controls an internal operation of the at least one nonvolatile memory device by determining the state of the buffer, in response to the first access command.

BRIEF DESCRIPTION OF THE DRAWINGS

These and other features and advantages of the present invention will become apparent to those skilled in the art to which the present invention pertains from the following detailed description of specific embodiments of the present invention in reference with the accompanying drawings.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited only to the embodiments set forth herein. Rather, these embodiments are provided for describing the present invention in sufficient detail to enable a person skilled in the art to which the invention pertains to enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It is further noted that in the following description, specific details are set forth for facilitating the understanding of the present invention, however, the present invention may be practiced without some of these specific details. Also, it is noted, that well-known structures and/or processes may have only been described briefly or not described at all to avoid obscuring the present disclosure with unnecessary well known details.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

Figure 1:
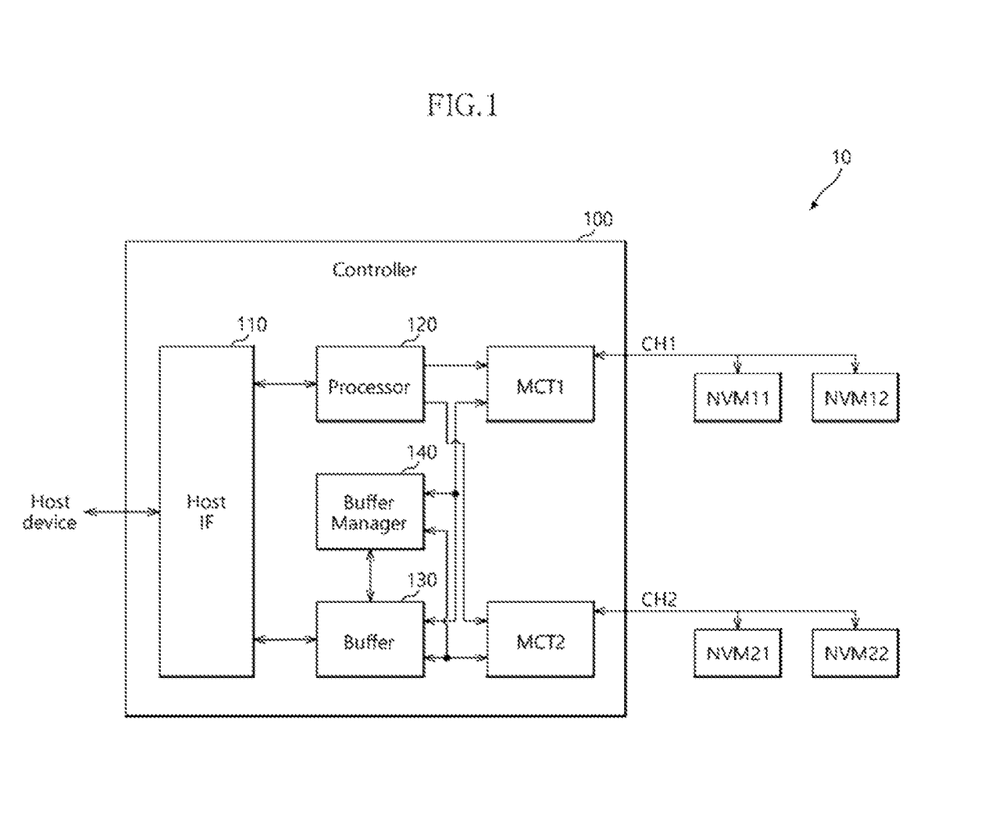
FIG. 1 is a block diagram illustrating a data storage device in accordance with an embodiment of the present invention.

FIG. 1 illustrates a data storage device 10 in accordance with an embodiment of the present invention.

The data storage device 10 may store write data received from a host device and transmit stored data to the host device, in response to access requests from the host device, that is, a write request and a read request, respectively.

The data storage device 10 may be configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The data storage device 10 may include a controller 100 and nonvolatile memory devices NVM11 to NVM22.

The controller 100 may store data in the nonvolatile memory devices NVM11 to NVM22 in response to a write request transmitted from the host device. The controller 100 may also read data stored in the nonvolatile memory devices NVM11 to NVM22 and output the read data to the host device in response to a read request received from the host device.

The controller 100 may include a host interface 110, a processor 120, a buffer 130, and memory controllers MCT1 and MCT2. While FIG. 1 illustrates 2 memory controllers MCT1 and MCT2 which are respectively coupled to channels CH1 and CH2, it is to be noted that the number of memory controllers is not limited thereto. The number of memory controllers may be changed depending on the number of channels.

The host interface 110 may communicate with the host device. The host interface 110 may receive a request such as a write or a read request from the host device and may transmit the received request e.g., the write request and the read request received from the host device, to the processor 120. The host interface 110 may transmit the write data received from the host device to the buffer 130, and also transmit the read data which are read from the nonvolatile memory devices NVM11 to NVM22 and are stored in the buffer 130, to the host device. The host interface 110 may be any suitable interface.

The processor 120 may determine a nonvolatile memory device to be accessed among the nonvolatile memory devices NVM11 to NVM22, that is, a target nonvolatile memory device, in response to the access request transmitted from the host interface 110. A memory controller, among the memory controllers MCT1 and MCT2, which is coupled to the target nonvolatile memory device, will also be referred to as a target memory controller. The processor 120 may transmit an access command, for example, a write command or a read command, to the target memory controller in response to the access request transmitted from the host interface 110.

The processor 120 may transmit the access command to the target memory controller regardless of a state of the buffer 130. A state of the buffer 130 may be determined by a buffer manager 140. Based on the state of the buffer 130 from the buffer manager 140, the target memory controller, i.e., one of the memory controllers MCT1 and MCT2 may determine whether to transmit an internal operation command to the target nonvolatile memory device.

The buffer 130 may temporarily store data to be transmitted between the host device and the nonvolatile memory devices NVM11 to NVM22. While the buffer 130 may be a volatile memory device such as a static random access memory (SRAM) or a dynamic random access memory (DRAM), it is to be noted that the embodiment is not limited thereto.

The buffer manager 140 may determine the state of the buffer 130. For example, when a write request is received from the host device, the buffer manager 140 may determine the state of the buffer 130 depending on whether write data has been completely transmitted to the buffer 130 from the host device. For example, when a read request is received from the host device, the buffer manager 140 may determine the state of the buffer 130 depending on whether a predetermined region of the buffer 130 is usable and whether data stored in the predetermined region of the buffer 130 is error-free.

The memory controllers MCT1 and MCT2 may be coupled to the channels CH1 and CH2, respectively. Each of the memory controllers MCT1 and MCT2 may receive, from the processor 120, access commands for the nonvolatile memory devices coupled to a corresponding channel, and store the received access commands in command queues (not shown) respectively corresponding to the nonvolatile memory devices. Each of the memory controllers MCT1 and MCT2 may determine the state of the buffer 130 from the buffer manager 140 in response to an access command, and transmit an internal operation command such as a write operation command and a read operation command to a target nonvolatile memory device according to a determination result, thereby controlling an internal operation of the target nonvolatile memory device.

A target memory controller which receives a write command from the processor 120 may determine whether write data has been completely transmitted to the buffer 130 from the host device, and control a write operation of a target nonvolatile memory device through a write operation command according to a determination result. When it is determined that write data has been completely transmitted to the buffer 130, the target memory controller may transmit the write operation command to the target nonvolatile memory device. When it is determined that write data has not been completely transmitted to the buffer 130, according to one embodiment, the target memory controller may not transmit the write operation command to the target nonvolatile memory device and may continuously check whether write data has been completely transmitted to the buffer 130. Then, when the target memory controller determines that the write data has been completely transmitted to the buffer 130 then the target memory controller may transmit the write operation command to the target nonvolatile memory device. The target nonvolatile memory device may store the write data by performing the write operation in response to the write operation command received from the target memory controller.

According to another embodiment, when it is determined that write data has not been completely transmitted to the buffer 130 but has been transmitted by a predetermined data size, the target memory controller may transmit a write operation command to the target nonvolatile memory device. Therefore, in the case where the size of the entire write data is substantially large, a write operation may start without standing by until the entire write data is completely transmitted so long as a predetermined size of data has already been transmitted to the buffer 130, and thus, a delay in the write operation may be suppressed. The predetermined size of data may be set in order to optimize at least one performance characteristic of the data storage device 10. For example, the predetermined size of data may be set depending on a unit by which the target nonvolatile memory device performs a write operation.

The target memory controller which receives a read command from the processor 120 may determine whether a predetermined region of the buffer 130 is usable, and according to a determination result, may control a read operation of the target nonvolatile memory device, through a read operation command, that is, a sensing operation command and a transmission operation command. The predetermined region of the buffer 130 may correspond to a read request from the host device, and may be designated by the host device or the processor 120 for processing the read request. The target memory controller may transmit the sensing operation command and the transmission operation command to the target nonvolatile memory device when it is determined that the predetermined region of the buffer 130 is usable. The target nonvolatile memory device may perform the sensing operation on read-requested target data and the transmission operation on the sensed data, in response to the sensing operation command and the transmission operation command, respectively. As a result, data transmitted from the target nonvolatile memory device may be stored in the predetermined region of the buffer 130, and may then be transmitted from the buffer to the host device via the host interface 110.

Meanwhile, in the case where the predetermined region of the buffer 130 is still in the state in which it is allocated for data corresponding to a previous read command, it will be determined that the predetermined region of the buffer 130 is unusable. When it is determined that the predetermined region of the buffer 130 is unusable, the target memory controller may determine whether the data stored in the predetermined region of the buffer 130 is error-free, and control the sensing operation of the target nonvolatile memory device according to a determination result. In detail, when it is determined that the data stored in the predetermined region of the buffer 130 is not error-free, the target memory controller may continuously check whether the data stored in the predetermined region of the buffer 130 is error-free. When it is determined that the data stored in the predetermined region of the buffer 130 is error-free, the target memory controller may transmit a sensing operation command to the target nonvolatile memory device. That is, in the case where the data stored in the predetermined region of the buffer 130 is error-free, since the corresponding error-free data is to be outputted immediately to the host device, the target memory controller may control the target nonvolatile memory device to start the sensing operation for the read command. The target nonvolatile memory device may perform the sensing operation to sense read-request target data, in response to the sensing operation command.

Then, after the sensing operation of the target nonvolatile memory device is performed, the target memory controller may determine whether the predetermined region of the buffer is usable, and control the transmission operation of the target nonvolatile memory device according to a determination result. In detail, when it is determined that the predetermined region of the buffer 130 is unusable, that is, when the data stored in the predetermined region is not outputted to the host device yet, the target memory controller may continuously check whether the predetermined region of the buffer 130 is usable. When it is determined that the predetermined region of the buffer 130 is usable, that is, after the data stored in the predetermined region is outputted to the host device, the target memory controller may transmit a transmission operation command to the target nonvolatile memory device.

According to an embodiment, when it is determined that the data stored in the predetermined region, that is, a first region, of the buffer 130 is not error-free, the target memory controller may determine whether a second region of the buffer 130 except for the first region is usable, and control the read operation of the target nonvolatile memory device as described above according to a determination result. In other words, when it is determined that the second region of the buffer 130 is usable, the target memory controller may transmit sequentially a sensing operation command and a transmission operation command to the target nonvolatile memory device. When it is determined that the second region of the buffer 130 is unusable, the target memory controller may determine whether the data stored in the second region is error-free, and, when it is determined that the data stored in the second region is error-free, the target memory controller may transmit a sensing operation command to the target nonvolatile memory device. After the sensing operation of the target nonvolatile memory device is performed, when it is determined that the second region of the buffer 130 is usable, the target memory controller may transmit a transmission operation command to the target nonvolatile memory device. The target memory controller may report to the processor 120 that the second region of the buffer 130 has been used for processing the read command. As a result, data transmitted from the target nonvolatile memory device is stored in the second region of the buffer 130, and the processor 120 may control the data stored in the second region of the buffer 130 to be outputted to the host device.

According to an embodiment, when it is determined that the target nonvolatile memory device which has performed the sensing operation needs for processing another read command earlier than the current read command, the processor 120 may abort the sensing operation of the target nonvolatile memory device. For example, as described above, when the data read beforehand and stored in the predetermined region of the buffer 130, for example, first data, is error-free, since the corresponding data is to be outputted immediately to the host device, the processor 120 may transmit a sensing operation command to the target nonvolatile memory device. However, thereafter, when it is determined that the data read beforehand from the target nonvolatile memory device and stored in another region of the buffer 130, for example, second data, is not error-free, the processor 120 should read again the second data. At this time, when it is determined that the read operation on the second data should be processed first, the processor 120 may abort the sensing operation of the target nonvolatile memory device performed beforehand, and control the read operation of the target nonvolatile memory device to read the second data in advance.

Each of the memory controllers MCT1 and MCT2 may determine the state of the buffer 130 from the buffer manager 140 in response to a plurality of access commands transmitted from the processor 120. In detail, each of the memory controllers MCT1 and MCT2 may determine the state of the buffer 130 in response to a second access command independently of determining the state of the buffer 130 in response to a first access command, thereby controlling an internal operation of a nonvolatile memory device corresponding to the second access command. The nonvolatile memory device corresponding to the second access command may be a nonvolatile memory device corresponding to the first access command, or may be another nonvolatile memory device. Each of the memory controllers MCT1 and MCT2 may process the first and second access commands according to the state of the buffer 130 regardless of a sequence in which the first and second access commands are received.

Also, each of the memory controllers MCT1 and MCT2 may determine the state of the buffer 130 independently of the other memory controller, thereby controlling the nonvolatile memory devices coupled to a corresponding channel.

Each of the memory controllers MCT1 and MCT2 may perform an encoding operation on the data stored in the buffer 130 and transmit the encoded data to a target nonvolatile memory device, and may perform a decoding operation on the data transmitted from a target nonvolatile memory device and store the decoded data in the buffer 130. By performing the decoding operation, each of the memory controllers MCT1 and MCT2 may notify the buffer manager (not shown) whether the data transmitted from the target nonvolatile memory device is error-free.

The nonvolatile memory devices NVM11 to NVM22 may be coupled to the memory controllers MCT1 and MCT2 through the respective channels CH1 and CH2. Each of the nonvolatile memory devices NVM11 to NVM22 may perform internal operations, that is, a write operation and a read operation, according to control of a corresponding memory controller. The read operation may include a sensing operation and a transmission operation as described above. While FIG. 1 illustrates that 2 nonvolatile memory devices are coupled to each of 2 channels, it is to be noted that the numbers of channels and nonvolatile memory devices are not limited thereto in the present embodiment.

Each of the nonvolatile memory devices NVM11 to NVM22 may be configured by a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like. In an embodiment, each of the nonvolatile memory devices NVM11 to NVM22 is a flash memory.

Figure 2:
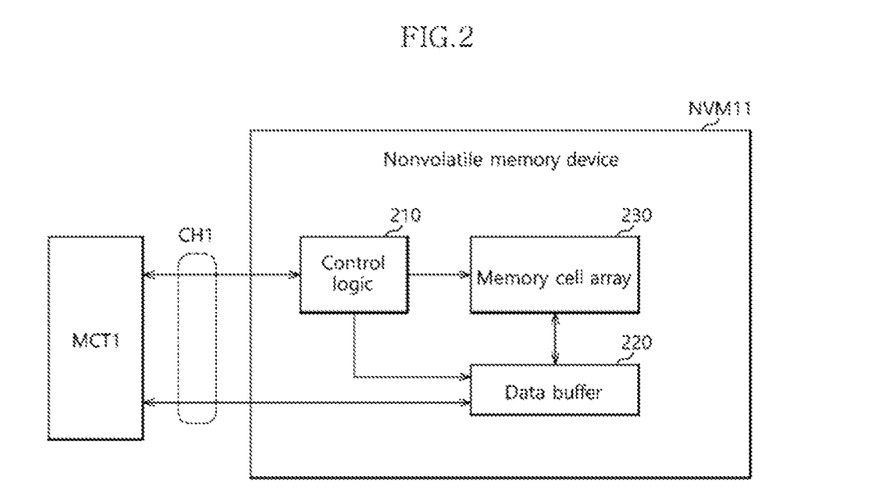
FIG. 2 is a block diagram illustrating a nonvolatile memory device employed in the data storage device of FIG. 1.

FIG. 2 is a block diagram illustrating an example configuration for the nonvolatile memory device NVM11 shown in FIG. 1. Since the nonvolatile memory device NVM11 may have same or substantially the same structure as any of the remaining of the nonvolatile memory devices NVM12 to NVM22, the nonvolatile memory device NVM11 is explained in FIG. 2 as an example.

The nonvolatile memory device NVM11 may include a control logic 210, a data buffer 220, and a memory cell array 230.

The control logic 210 may control the memory cell array 230 and the data buffer 220 in response to an internal operation command received through the channel CH1 from the memory controller MCT1, such as a write operation command and a read operation command. The control logic 210 may store write data transmitted through the channel CH1 in the data buffer 220 and transfer the write data form the data buffer 220 to the memory cell array 230, in response to the write operation command.

The control logic 210 may sense data stored in the memory cell array 230 and store the sensed data in the data buffer 220 in response to a sensing operation command of the read operation command, and transmit the data stored in the data buffer 220, to the memory controller MCT1, in response to a transmission operation command of the read operation command.

The data buffer 220 may temporarily store data between the memory controller MCT1 and the memory cell array 230. For example, in a write operation the data buffer 220 may temporarily store write received from the memory controller MCT1 via the channel CH1. Also, in a read operation the data buffer 220 may temporarily store read data read from the cell array 230 before the control logic 210 can transmit the read data to the buffer 130 of the controller 100.

The memory cell array 230 may include a plurality of memory cells for storing data. The memory cell array may be a two-dimensional (2D) or a three-dimensional (3D) structure.

According to an embodiment, the memory controllers MCT1 and MCT2 may check the state of the buffer 130, and the processor 120 may immediately transmit access commands to the memory controllers MCT1 and MCT2 even before the state of the buffer 130 is checked, i.e., without checking the state of the buffer 130, when an access request is received from the host device. Therefore, the overhead of the processor 120 may be decreased, and the operational performance of the data storage device 10 may be improved. The memory controllers MCT1 and MCT2 may check independently the state of the buffer 130 in response to a plurality of access commands, thus further improving command processing speeds.

Figure 3:
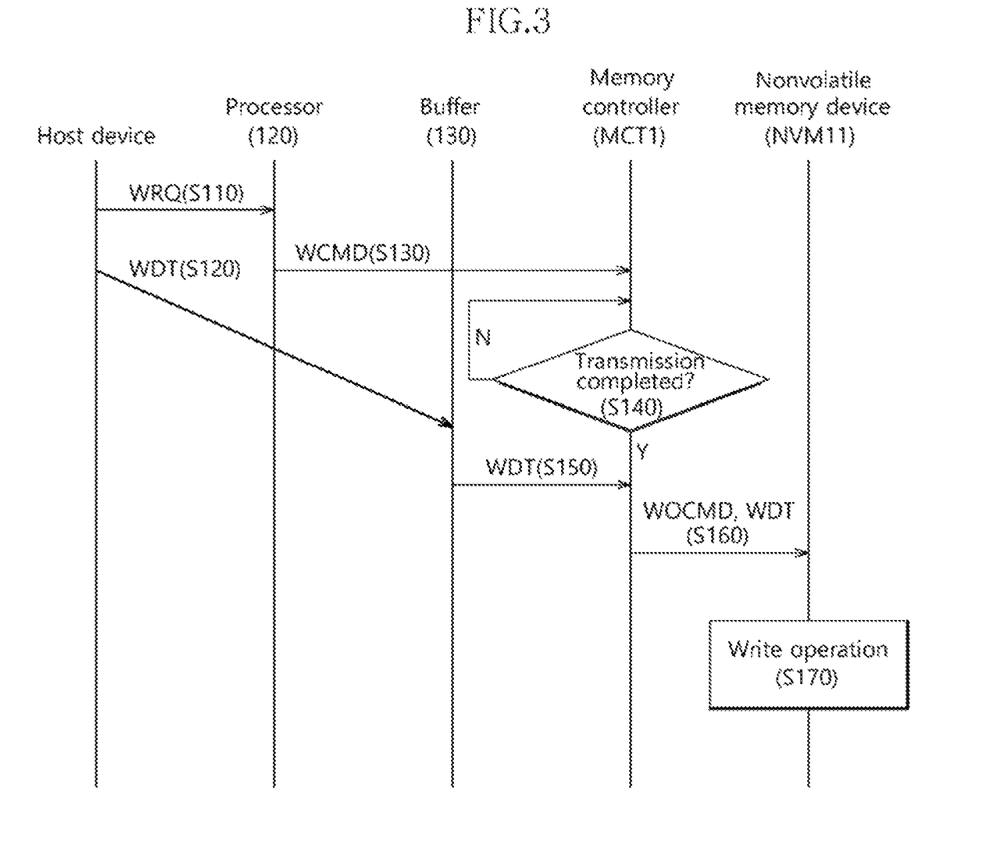
FIG. 3 is a diagram explaining a method for the data storage device of FIG. 1 for processing a write request received from a host device.

FIG. 3 is a diagram explaining a method for the data storage device 10 of FIG. 1 for processing a write request received from a host device. Descriptions for the operation of the host interface 110 shown in FIG. 1 will be omitted in FIG. 3 for the sake of convenience in explanation. In the following descriptions, it is further assumed that a target memory controller is the memory controller MCT1 and a target nonvolatile memory device is the nonvolatile memory device NVM11.

At step S110, the processor 120 may receive a write request WRQ from the host device.

At step S120, the buffer 130 may receive write data WDT from the host device.

At step S130, the processor 120 may transmit a write command WCMD to the target memory controller MCT1 in response to the write request WRQ, regardless of the state of the buffer 130, i.e., regardless of whether the transmission of the write data to the buffer 130 has been completed.

Then, after receiving the write command WCMD and in response to the write command WCMD, the target memory controller MCT1 may, at step S140, determine whether the write data WDT has been completely transmitted to the buffer 130. When it is determined that the write data WDT has not been completely transmitted to the buffer 130 ("N" at step 140), the target memory controller MCT1 may continuously check whether the write data WDT has been completely transmitted to the buffer 130, i.e., step S140 is iterated until a yes determination is made ("Y" at step S140). When it is determined that the write data WDT has been completely transmitted to the buffer 130 ("Y" at step 140), the process may proceed to step S150.

At step S150, the target memory controller MCT1 may then obtain the write data WDT from the buffer 130.

At step S160, after having obtained the write data WDT from the buffer 130, the target memory controller MCT1 may then transmit a write operation command WOCMD together with the write data WDT to the target nonvolatile memory device NVM11.

At step S170, the target nonvolatile memory device NVM11 may perform a write operation on the write data WDT in response to the write operation command WOCMD received from the target memory controller MCT1.

Figure 4:
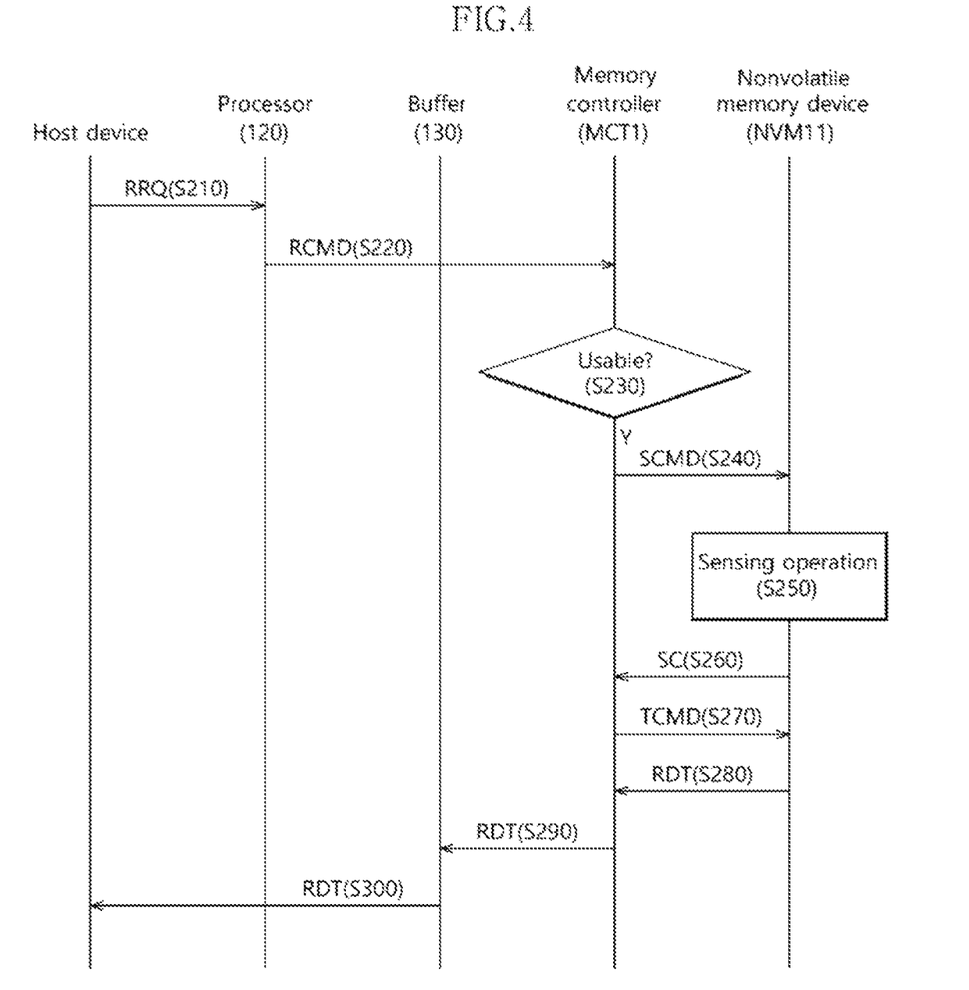
FIGS. 4 and 5 are diagrams explaining methods for the data storage device of FIG. 1 for processing read requests from the host device.
Figure 5:
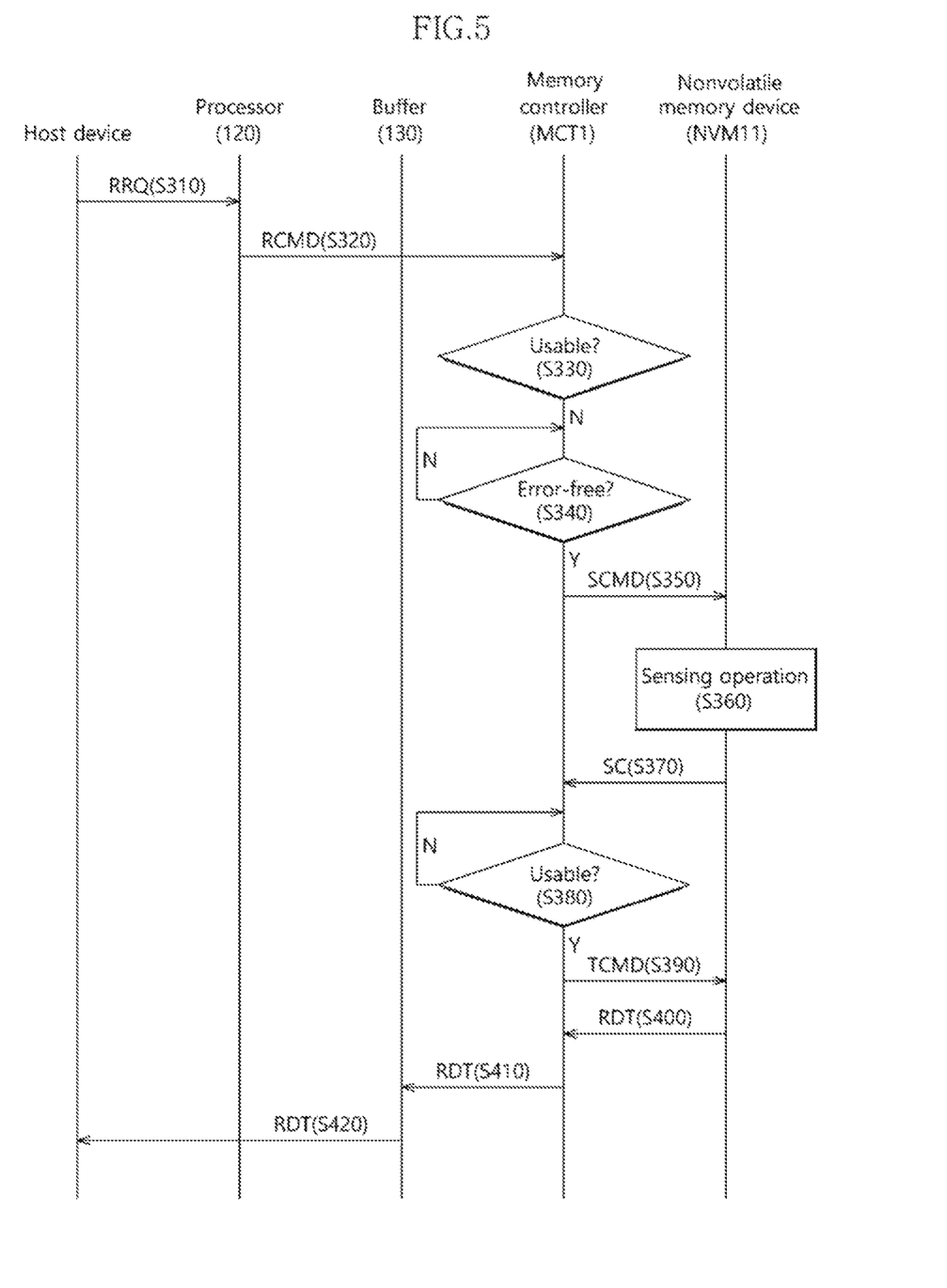

FIGS. 4 and 5 are diagrams explaining methods for the data storage device 10 of FIG. 1 for processing read requests from the host device. Descriptions for the operation of the host interface 110 shown in FIG. 1 will be omitted in FIGS. 4 and 5 for the sake of convenience in explanation.

Referring to FIG. 4, at step S210, the processor 120 may receive a read request RRQ from the host device for the nonvolatile memory device NVM11.

At step S220, the processor 120 may transmit a read command RCMD to the target memory controller MCT1 in response to the read request RRQ, regardless of the state of the buffer 130.

At step S230, the target memory controller MCT1 may determine whether a predetermined region of the buffer 130 is usable, in response to the read command RCMD. The predetermined region of the buffer 130 may be designated by the host device or the processor 120. As illustrated in FIG. 4, the target memory controller MCT1 may determine that the predetermined region of the buffer 130 is usable ("Y" at step 230).

Then at step S240, the target memory controller MCT1 may transmit a sensing operation command SCMD to the target nonvolatile memory device NVM11.

At step S250, the target nonvolatile memory device NVM11 may perform a sensing operation on data stored in the memory cell array 230, and store the sensed data in the data buffer 220, in response to the sensing operation command SCMD.

At step S260, the target nonvolatile memory device NVM11 may transmit a sensing completion report SC to the target memory controller MCT1.

At step S270, the target memory controller MCT1 may transmit a transmission operation command TCMD to the target nonvolatile memory device NVM11.

At step S280, upon receipt of the transmission operation command TCMD, the target nonvolatile memory device NVM11 may transmit read data RDT stored in the data buffer 220, to the target memory controller MCT1, in response to the transmission operation command TCMD.

At step S290, the target memory controller MCT1 may store the data RDT transmitted from the target nonvolatile memory device NVM11, in the predetermined region of the buffer 130.

At step S300, the data stored in the predetermined region of the buffer 130 may be outputted to the host device.

Referring to FIG. 5, steps S310 and S320 may be the same as the steps S210 and S220 of FIG. 4.

However, at step S330, the target memory controller MCT1 may determine that the predetermined region of the buffer 130 is unusable ("N" at step 330) in which case the target memory controller will proceed to step S340.

At step S340, the target memory controller MCT1 may determine whether the data stored in the predetermined region of the buffer 130 is error-free. When it is determined that the data stored in the predetermined region of the buffer 130 is not error-free ("N" at step 340), the target memory controller MCT1 may continuously check whether the data stored in the predetermined region of the buffer 130 is error-free, i.e., step S340 is iterated until a determination is made that the predetermined region of the buffer 230 is error-free. When in subsequent iteration of step S140, it is determined that the data stored in the predetermined region of the buffer 130 is error-free ("Y" at step 340), the process may then proceed to step S350.

At step S350, the target memory controller MCT1 may transmit a sensing operation command SCMD to the target nonvolatile memory device NVM11. That is, since error-free data may be outputted immediately to the host device, the predetermined region of the buffer 130 may be changed immediately to a usable state. Therefore, the target memory controller MCT1 may control the target nonvolatile memory device NVM11 to start the sensing operation in response to the sensing operation command SCMD.

At step S360, the target nonvolatile memory device NVM11 may perform a sensing operation on the data stored in the memory cell array 230, and store the sensed data in the data buffer 220, in response to the sensing operation command SCMD.

At step S370, the target nonvolatile memory device NVM11 may transmit a sensing completion report SC to the target memory controller MCT1.

At step S380, the target memory controller MCT1 may determine whether the predetermined region of the buffer 130 is usable. When it is determined that the predetermined region of the buffer 130 is unusable ("N" at step 380), the target memory controller MCT1 may continuously check whether the predetermined region of the buffer 130 is usable, i.e., step S380 may be iterated until a determination is made that the predetermined region of the buffer 130 is usable. In the case where the data stored in the predetermined region of the buffer 130 is outputted to the host device, the predetermined region of the buffer 130 may be changed to a usable state. Hence, when in a subsequent iteration of the step S380 it is determined that the predetermined region of the buffer 130 is usable ("Y" at step 380), the process may proceed to step S390.

At step S390, the target memory controller MCT1 may transmit a transmission operation command TCMD to the target nonvolatile memory device NVM11.

At step S400, the target nonvolatile memory device NVM11 may transmit data RDT stored in the data buffer 220, to the target memory controller MCT1, in response to the transmission operation command TCMD.

Steps S410 and S420 may be the same as the steps S290 and S300 of FIG. 4.

While it is illustrated in FIG. 5 that the step S380 is performed after the step S370, it is to be noted that the step S380 may be performed immediately after the step S350.

Figure 6:
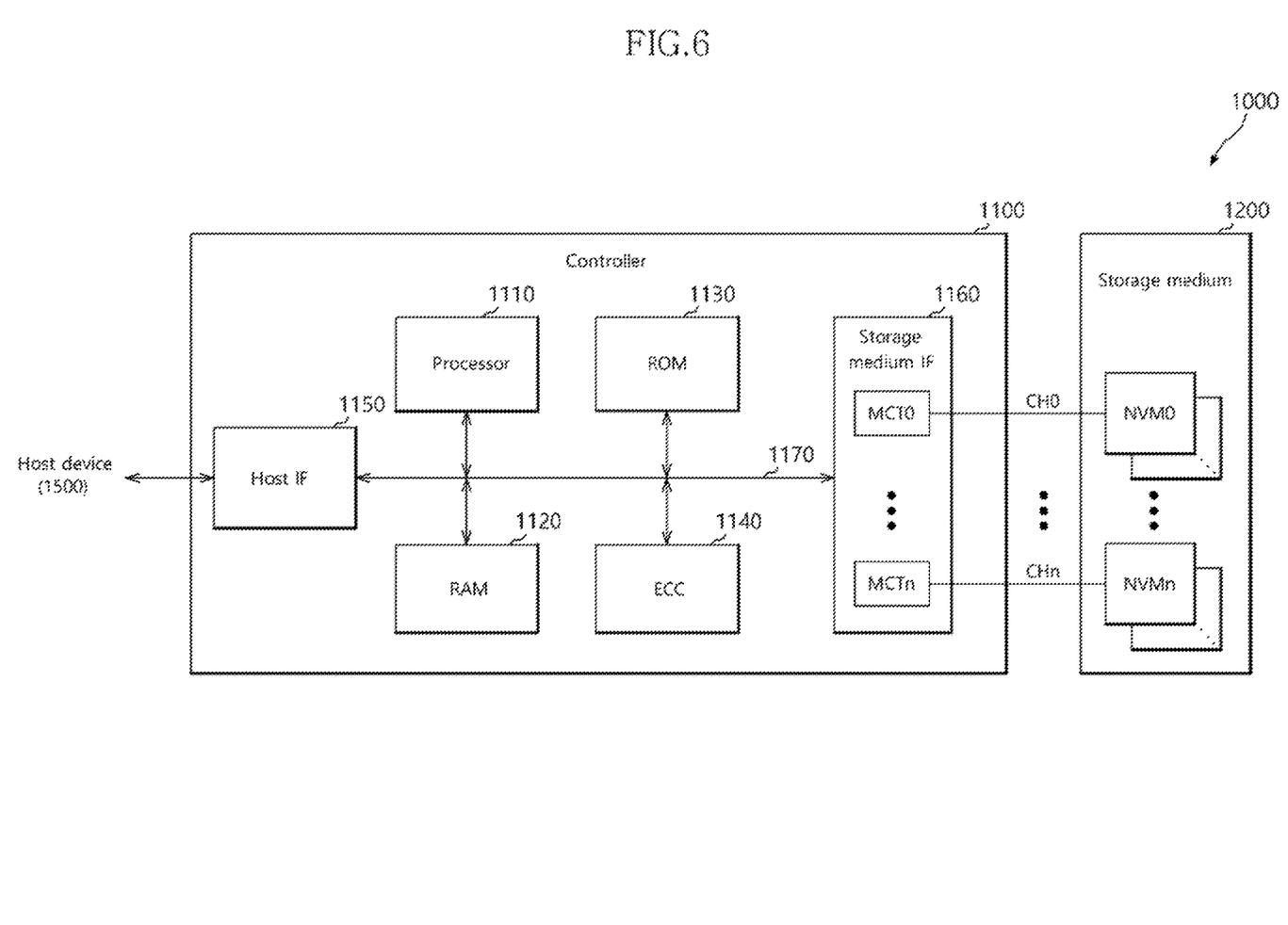
FIG. 6 is a block diagram illustrating a solid state drive (SSD) in accordance with an embodiment of the present invention.

FIG. 6 is a block diagram illustrating a solid state drive (SSD) 1000 in accordance with an embodiment of the present invention.

The SSD 1000 may include a controller 1100 operatively coupled to a storage medium 1200.

The controller 1100 may control data exchange between a host device 1500 and the storage medium 1200. The controller 1100 may include a processor 1110, a Random Access Memory (RAM) 1120, a Read Only Memory (ROM) 1130, an Error Correction Circuit (ECC) 1140, a host interface 1150 and a storage medium interface 1160, which are coupled through a bus 1170.

The processor 1110 may control an operation of the controller 1100 in response to a request received from the host device 1500. The processor 1110 may store data in the storage medium 1200 in response to a write request received from the host device 1500. The processor 1110 may read stored data from the storage medium 1200, in response to a read request from the host device 1500. Generally, the processor may control the exchange of data between the host device 1500 and the storage medium 1200 in response to a data processing request received from the host device 1500. The processor 1110 may, in order to more efficiently manage the storage medium 1200, control internal operations of the SSD 1000 such as a merge operation, a wear leveling operation, and so forth.

The processor 1110 may be or include the processor 120 of FIG. 1. The processor 1110 may transmit an access command to a target memory controller MCT1 OR MCTn which may be included in the storage medium interface 1160 in response to an access request transmitted from the host device 1500, regardless of the state of the RAM 1120.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500. The RAM 1120 may be or include the buffer 130 of FIG. 1.

The ROM 1130 may store program codes to be read by the processor 1110. The program codes may include commands to be processed by the processor 1110, such that the processor 1110 may control the internal units of the controller 1100.

The ECC 1140 may encode data to be stored in the storage medium 1200, and may decode data read from the storage medium 1200. The ECC 1140 may detect and correct an error occurred in data, according to an ECC algorithm.

The host interface 1150 may exchange data processing requests, and data with the host device 1500. The host interface 1150 may include the host interface 110 of FIG. 1.

The storage medium interface 1160 may transmit control signals and data to the storage medium 1200. The storage medium interface 1160 may receive data from the storage medium 1200. The storage medium interface 1160 may be coupled to the storage medium 1200 through a plurality of channels CH0 to CHn.

The storage medium interface 1160 may include a plurality of memory controllers MCT0 to MCTn identical to memory controller MCT1 and MCT2 of FIG. 1. In an embodiment, the plurality of memory controllers MCT0 to MCTn may correspond to the plurality of channels CH0 to CHn. The storage medium interface 1160 may determine the state of the RAM 1120 in response to the access command transmitted from the processor 1110, and transmit an internal operation command to a target nonvolatile memory device according to a determination result, thereby controlling an internal operation of the target nonvolatile memory device.

The storage medium 1200 may include the plurality of nonvolatile memory devices NVM0 to NVMn. One or more nonvolatile memory devices may be operatively coupled to each channel CH0 to CHn and via a respective channel to a plurality of memory controllers. Each of the plurality of nonvolatile memory devices NVM0 to NVMn may perform a write operation and a read operation according to control of the controller 1100.

Figure 7:
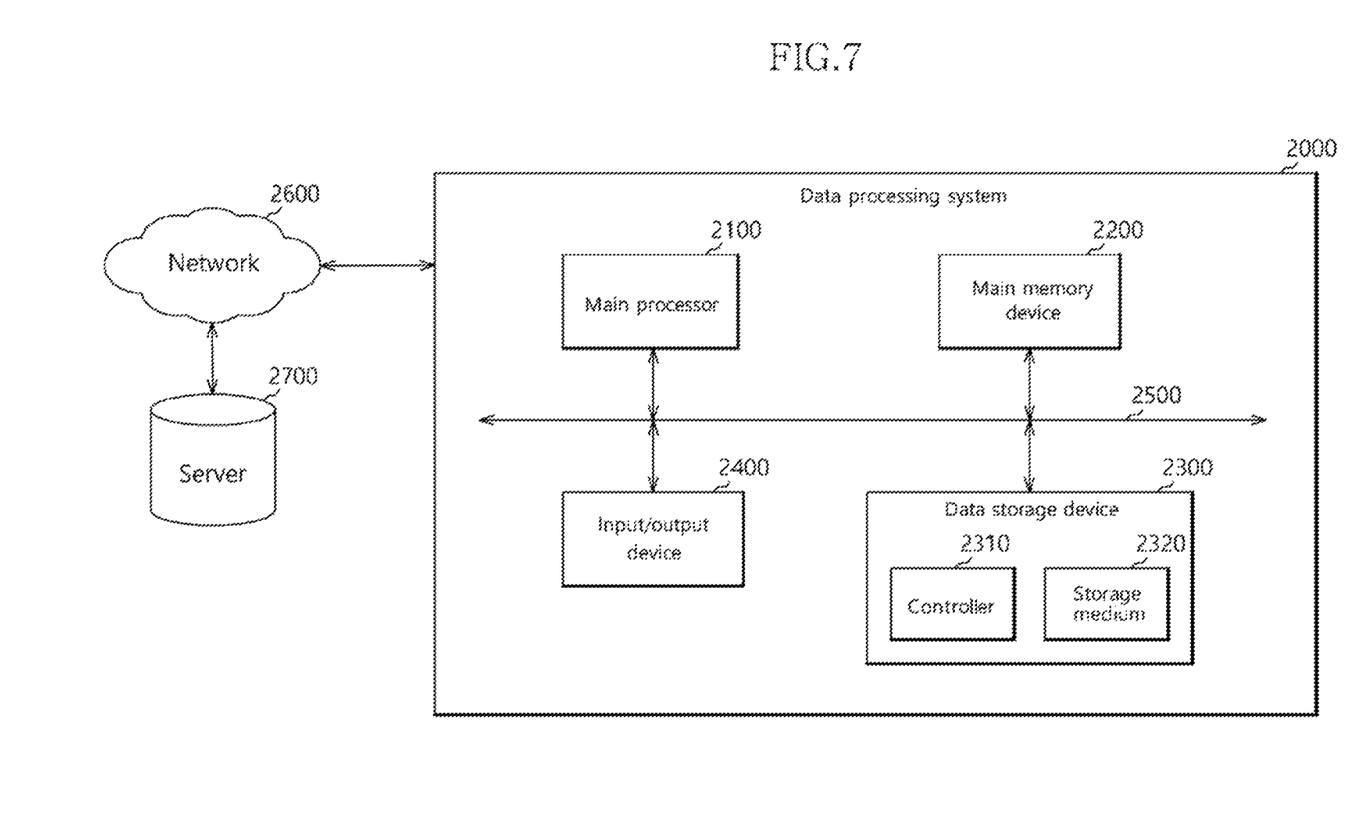
FIG. 7 is a block diagram illustrating a data processing system to which a data storage device in accordance with an embodiment of the present invention is applied.

FIG. 7 is a block diagram illustrating a data processing system 2000 to which a data storage device in accordance with the embodiment of the present invention is applied.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control an operation of the data processing system 2000. The main processor 2100 may be a central processing unit, for example, a microprocessor. The main processor 2100 may execute softwares such as an operating system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate the same or substantially the same to the data storage device 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood by those skilled in the art to which the present invention pertains that the described embodiments are only a few examples of the invention. Accordingly, the data storage device and the operating method thereof described herein should not be limited only to the described embodiments. It will be apparent to those skilled in the art to which the present invention pertains that various other changes and modifications may be made without departing from the spirit and scope of the invention as defined in the following claims.

What is claimed is:

1. A data storage device comprising:
   at least one nonvolatile memory device operatively coupled to each of a plurality of channels; and
   a controller including a processor, a first buffer and a plurality of memory controllers, the plurality of memory controllers being respectively coupled to the channels,
   wherein the first buffer includes a first region corresponding to a read request from a host device,
   wherein the processor transmits a read command to a first memory controller in response to the read request, regardless of a state of the first region,
   wherein the first memory controller controls a sensing operation of a first nonvolatile memory device on target data to be stored in the first region in response to the read command and holds off a transmission operation, in which sensed data is transmitted from a data buffer of the first nonvolatile memory device to the first region of the first buffer, when it is determined that, although the first region is being used for storing data which is read from the at least one nonvolatile memory device in response to a previous read command, the data is error-free,
   wherein the first nonvolatile memory device includes a memory cell array and the data buffer and senses the target data stored in the memory cell array by performing the sensing operation and stores the sensed data in the data buffer until the transmission operation is performed.

2. The data storage device according to claim 1, wherein the processor transmits a write command to the first memory controller in response to a write request from the host device, regardless of whether write data is completely transmitted to the buffer from the host device.

3. The data storage device according to claim 2, wherein the first memory controller determines whether the write data is completely transmitted to the buffer, in response to the write command, and controls a write operation of the first nonvolatile memory device on the write data when it is determined that the write data is completely transmitted to the buffer.

4. The data storage device according to claim 1, wherein the first memory controller determines whether the first region is usable, in response to the read command, and controls a read operation of the first nonvolatile memory device when it is determined that the first region is usable.

5. The data storage device according to claim 1, wherein the first memory controller determines whether the first region is usable, in response to the read command,
   determines whether the data stored in the first region is error-free when it is determined that the first region is unusable, and
   controls the sensing operation of the first nonvolatile memory device on the target data corresponding to the read command when it is determined that the data is error-free.

6. The data storage device according to claim 5,
   wherein the buffer further includes a second region, and
   wherein the first memory controller determines whether the second region is usable when it is determined that the data is not error-free, and controls a read operation of the first nonvolatile memory device when it is determined that the second region is usable.

7. The data storage device according to claim 5, wherein the first memory controller aborts the sensing operation when it is determined that the first nonvolatile memory device needs for processing another read command earlier than the read command.

8. The data storage device according to claim 5, wherein, after controlling the sensing operation, when it is determined that the first region is usable, the first memory controller controls the transmission operation of the first nonvolatile memory device on the sensed data.

9. The data storage device according to claim 8, wherein, after controlling the sensing operation, when it is determined that the first region is still unusable, the first memory controller continuously checks whether the first region is usable, and wherein the first nonvolatile memory device keeps sensed data until it is determined that the first region is usable.

10. The data storage device according to claim 1,
    wherein the processor transmits a first access command and a second access command to the first memory controller in response to a first access request and a second access request from the host device, regardless of the state of the buffer, and
    wherein the first memory controller controls an internal operation of a nonvolatile memory device corresponding to the first access command and controls an internal operation of a nonvolatile memory device corresponding to the second access command by determining the state of the buffer in response to the second access command, independently of determining the state of the buffer in response to the first access command.

11. The data storage device according to claim 1,
    wherein the processor transmits a first access command to the first memory controller in response to a first access request from the host device and transmits a second access command to a second memory controller in response to a second access request from the host device, regardless of the state of the buffer,
    wherein the first memory controller controls an internal operation of the first nonvolatile memory device by determining the state of the buffer in response to the first access command, and
    wherein the second memory controller controls an internal operation of a second nonvolatile memory device by determining the state of the buffer in response to the second access command, independently of the first memory controller.

12. A data storage device comprising:
    nonvolatile memory devices coupled to a plurality of channels; and
    a controller including a first buffer which includes a first region and memory controllers which are respectively coupled to the channels,
    wherein a first memory controller among the memory controllers controls a sensing operation of a first nonvolatile memory device on target data to be stored in the first region in response to a first read command and holds off a transmission operation, in which sensed data is transmitted from a data buffer of the first nonvolatile memory device to the first region of the first buffer, when it is determined that, although the first region is being used for storing data which is read from the nonvolatile memory devices in response to a previous read command, the data is error-free,
    wherein the first nonvolatile memory device includes a memory cell array and the data buffer and senses the target data stored in the memory cell array by performing the sensing operation and stores the sensed data in the data buffer until the transmission operation is performed.

13. The data storage device according to claim 12, wherein the first memory controller controls a read operation when it is determined that the first region is usable, and stores data transmitted from the first nonvolatile memory device in the first region.

14. The data storage device according to claim 12, wherein the first memory controller determines whether the data stored in the first region is error-free, when it is determined that the first region is unusable.

15. The data storage device according to claim 14, wherein, after controlling the sensing operation, when it is determined that the first region is usable, the first memory controller controls the transmission operation of the first nonvolatile memory device on the sensed data, and stores data transmitted from the first nonvolatile memory device in the first region.

16. The data storage device according to claim 14,
    wherein the buffer further includes a second region, and
    wherein the first memory controller determines whether the second region is usable when it is determined that the data is not error-free, controls the read operation when it is determined that the second region is usable, and stores data transmitted from the first nonvolatile memory device in the second region.

17. The data storage device according to claim 12,
    wherein the buffer further includes a second region, and
    wherein the first memory controller controls a read operation of a nonvolatile memory device corresponding to a second read command, by determining a state of the second region in response to the second read command, independently of determining the state of the first region.

18. The data storage device according to claim 17, wherein the first memory controller processes the first and second read commands regardless of a sequence in which the first and second read commands are received.

19. The data storage device according to claim 12,
wherein the buffer further includes a second region, and
wherein a second memory controller among the memory controllers controls a read operation of a second nonvolatile memory device by determining a state of the second region, in response to the second read command, independently of the first memory controller.

20. A solid state drive comprising a processor, a RAM and a storage medium interface, the storage medium interface including at least one memory controller operatively coupled to at least one nonvolatile memory device via a channel,
wherein the RAM includes a first region corresponding to a read request from a host device,
wherein the processor transmits a read command to the at least one memory controller in response to the read request, regardless of a state of the first region, and
wherein the at least one memory controller controls a sensing operation of the at least one nonvolatile memory device on target data to be stored in the first region in response to the read command and holds off a transmission operation, in which sensed data is transmitted from a data buffer of the at least one nonvolatile memory device to the first region of the RAM, when it is determined that, although the first region is being used for storing data which is read from the at least one nonvolatile memory device in response to a previous read command, the data is error-free,
wherein the at least one nonvolatile memory device includes a memory cell array and a data buffer and senses the target data stored in the memory cell array by performing the sensing operation and stores the sensed data in the data buffer until the transmission operation is performed.

\* \* \* \* \*